UNITED STATES PATENT OFFICE.

HENRY H. SMITH, OF WILMINGTON, NORTH CAROLINA.

PURIFYING WATER.

SPECIFICATION forming part of Letters Patent No. 337,026, dated March 2, 1886.

Application filed October 30, 1885. Serial No. 181,420. (No specimens.)

*To all whom it may concern:*

Be it known that I, HENRY H. SMITH, a citizen of the United States, residing at Wilmington, in the county of New Hanover and State of North Carolina, have invented certain new and useful Improvements in Purifying Water, of which the following is a specification.

Heretofore many different means of purifying water have been devised, but for various reasons have not come into general use, although some of them have been used where the expense was a minor consideration. Alum, for instance, is a well-known coagulant that has been used for many years to clarify water; but its use on a large scale—as, for instance, in a city water-works—is too expensive for general use. There is, moreover, the objection that sulphuric acid is liberated as the alum is dissolved, which mixes with the water, and is considered by many to be obnoxious, if not unhealthy. A solution of lime has also been used as a coagulant; but its use on a large scale has been attended with difficulties that render it almost impracticable.

My invention is designed to overcome these difficulties by a process at once simple and cheap; and it consists, essentially, in bringing the particles of water in intimate connection with granular material coated with a pellicle of lime.

This process and method of filtration is adapted to and especially intended for the economical purification of the waters of our Southern and Western rivers, which are highly colored by clays held in suspension, and the complete purification of which has hitherto been deemed impracticable by mechanical filtration.

The following is the preferable way of carrying out my invention: I take ordinary sand, gravel, pebbles, broken stone, bricks, or other suitable granular material, and mix the same with lime (oxide of calcium) in the proportion of one part of lime to eight or ten parts of sand, and after tempering the same with water allow the mixture to stand for about ten days, or longer, and then break up the mass in any suitable manner into smaller particles. By this operation each particle of the sand or other granular matter is coated with a thin pellicle of lime, which, as is well known, adheres strongly thereto, and is but very slightly soluble in water—in fact, it may be said to be practically insoluble.

The sand or granular matter thus prepared may be used in a filter of any suitable construction like ordinary sand, and the water in passing through is not only mechanically filtered in the manner usual with sand, but the lime that coats the granular material having an affinity for the clay in solution retains matter that ordinary sand would allow to pass, and water passed through a filter provided with my lime-coated sand will therefore pass out of the same as clear as crystal and entirely freed from its impurities, while the same kind of water passed through the same filter provided with ordinary uncoated sand would still be very badly discolored, owing to the clay held in solution therein.

The sand thus coated will last a long time without losing its purifying qualities, if occasionally washed in the manner now commonly used in many filters; but when in the course of time its coating has become worn away its powers can be readily renewed by again mixing it with lime.

It is evident that it is not always necessary to use new sand and lime, as old mortar, if broken up fine and thoroughly washed, may be used for this purpose, and thus a waste material may be utilized which is now of no value.

What I claim as new is—

1. The improvement in the art of purifying water, which consists in bringing the same into intimate contact with granular material coated with lime, as set forth.

2. The improvement in the art of purifying water, which consists in passing the same through a body of sand coated with lime, whereby the coloring-matter and other impurities held in suspension are arrested and retained, as set forth.

In testimony whereof I affix my signature, in presence of two witnesses, this 30th day of October, 1885.

HENRY H. SMITH.

Witnesses:
T. J. W. ROBERTSON,
JULIUS SOLGER.